United States Patent
Ueda et al.

(10) Patent No.: US 6,350,850 B1
(45) Date of Patent: Feb. 26, 2002

(54) PROCESS FOR PRODUCING POLYESTER

(75) Inventors: Mitsuru Ueda; Hiroyuki Takahashi, both of Tokyo; Teruaki Hayakawa, Tsukuba; Tadashi Teranishi, Hyogo, all of (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/614,650

(22) Filed: Jul. 12, 2000

(30) Foreign Application Priority Data

Jul. 14, 1999 (JP) ............................................. 11-199768
Apr. 25, 2000 (JP) ........................................ 2000-124409

(51) Int. Cl.$^7$ ............................................... C08G 63/78
(52) U.S. Cl. ...................... 528/283; 528/274; 528/302; 524/700; 524/783
(58) Field of Search .................................. 528/274, 283, 528/302; 524/700, 783

(56) References Cited

U.S. PATENT DOCUMENTS 6,121,343 A * 9/2000 Hongo et al. ................ 523/102

* cited by examiner

*Primary Examiner*—Samuel A. Acquah
(74) *Attorney, Agent, or Firm*—Oppenheimer Wolff & Donnelly, LLP

(57) ABSTRACT

The present invention is a process for producing a polyester from a dicarboxylic acid and a diol, which comprises polycondensing the dicarboxylic acid and the diol under the presence of a distannoxane catalyst. Also, the present invention is a process for producing a polyester which comprises melt polycondensing the dicarboxylic acid and the diol under normal pressure in the presence of the distannoxane catalyst, wherein an organic solvent which dose not dissolved any of the dicarboxylic acid, the diol and the polyester produced from the dicarboxylic acid the diol is present and, whereby, two phases are mainly present.

17 Claims, No Drawings

PROCESS FOR PRODUCING POLYESTER

BACKGROUND OF THE INVENTION

1. Field of the Invention

The present invention relates to a process for producing a polyester, in particular, an aliphatic polyester. More particularly, the present invention relates to a process for producing a polyester by which a high polymerization degree polymer can be easily obtained and which is industrially effective.

2. Prior Art

An aromatic polyester, a representative of which is polyethylene terephthalate, is widely used in a fiber material, a film, a container and an engineering plastic. On the other hand, an aliphatic polyester is utilized as a suture. In addition, since an aliphatic polyester is biodegradable and is easily recycled and degraded, its utility tends to extend year by year in view of the problems on recent plastic waste.

As a process for producing a polyester, a process is generally performed in which a dicarboxylic acid component and a diol component are polycondensed using as a catalyst a proton acid such as sulfuric acid or a metal compound such as titanium alkoxide. However, since an equilibrium constant for a polyesterification reaction is around 1 to 10, in order to obtain a high polymerization degree polymer, it is necessary to remove as much produced water as possible and shift the equilibrium towards a product side. The necessity of this dehydration procedure is a factor of rendering high polymerization degree polyester synthesis difficult.

As a process for synthesizing a polyester that improves such problems and which is industrially applied, there is a process for production with a microorganism and a process for polymerization in a high boiling point solvent. However, in the synthesis with a microorganism, large scale synthesis is difficult and, additionally, it is difficult to obtain a pure polymer by removing a microorganism. In addition, in the process for polymerization using a high boiling point solvent, a remaining solvent in a polyester article becomes problematic. Also, because hydrolysis occurs more easily in a aliphatic polyester than in an aromatic polyester, removal of water in the polymerization system becomes a great problem and there are many problems for industrialization such as increase in plant investment and complication in the polymerization process.

DESCRIPTION OF THE PRESENT INVENTION

An object of the present invention is to provide a process for producing a polyester which can easily afford a high polymerization degree polymer without the use of a high boiling point solvent and dehydration procedure under reduced pressure.

In order to attain the aforementioned object, the present inventors studied intensively and, as a result, found that a high polymerization degree polyester can be obtained without the use of high a boiling point solvent and dehydration procedure under reduced pressure by using a distannoxane catalyst, which resulted in the completion of the present invention.

That is, the present invention is a process for producing a polyester from a dicarboxylic acid and a diol which comprises polycondensing the dicarboxylic acid and the diol in the presence of a distannnoxane catalyst.

Also, the present invention is a process for producing a polyester from the dicarboxylic acid and the diol, which comprises melt polycondensation of the carboxylic acid and the diol under normal pressure in the presence of the distannoxane catalyst and also in the presence of an organic solvent which does not dissolve any of the dicarboxylic acid, the diol and the polyester produced from the carboxylic acid and the diol and, as a result, in the presence of mainly two phases.

As used herein, "normal pressure" refers to the usual atomospheric status without application of reduced pressure and pressurization.

In the present invention, as a distannoxane catalyst used, there is a distannoxane catalyst represented by the following formula (1):

[Chemical Formula 3]

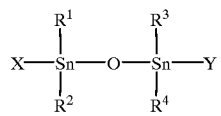

(1)

wherein $R^1$, $R^2$, $R^3$ and $R^4$ are the same or different and denote alkyl group, and X and Y are the same or different and denote isothiocyanate group, halogen atom, hydroxy group, alkoxy group, or acyloxy group.

Examples of the alkyl group in $R^1$, $R^2$, $R^3$ and $R^4$ in the aforementioned formula (1) are straight or branched alkyl groups having a carbon number of 1 to 10 such as methyl, ethyl, propyl, isopropyl, n-butyl, isobutyl, s-butyl, t-butyl, pentyl, hexyl, heptyl and octyl group. Inter alia, alkyl groups having a carbon number of 1 to 6 are preferable. In particular, $C_4$ alkyl group such as n-butyl group is preferable.

Within a halogen atom in X and Y are included chlorine, bromine and iodine. Inter alia, a preferable halogen atom is chlorine and bromine atom, in particular chlorine atom.

Examples of the alkoxy group in X and Y are alkoxy groups having a carbon number of 1 to 10 (preferably a carbon number 1 to 6 ) such as methoxy, ethoxy, propoxy, isopropoxy, butoxy, isobutyloxy, s-butyloxy, t-butyloxy, pentyloxy, hexyloxy and octyloxy group. These alkoxy groups may have hydroxyl group. Within such alkoxy group having hydroxy group are included 2-hydoxyethoxy group, 2-hydoxypropoxy group, 3-hydoxypropoxy group and 4-hydroxybutoxy group.

Examples of the acyloxy group in X and Y are aliphatic acyloxy groups having a carbon number of 2 to 10 (preferably, a carbon number of 2 to 5) such as acetoxy, propionyloxy, butyryloxy, valeryloxy and hexanoyloxy group. These acyloxy groups may have carboxyl group.

Within such acyloxy group having carboxyl group are included carboxyacetyloxy, 2-carboxypropionyloxy, 3-carboxypropionyloxy and 4-carboxybutyryloxy group.

Among the distannoxanes represented by the formula(1), those compounds are preferable in which $R^1$, $R^2$, $R^3$ and $R^4$ are each n-butyl group, X and Y are isothiocyanate group, halogen atom (for example, chlorine and the like), hydroxy group, alkoxy group (for example, alkoxy group having a carbon number of 1 to 6 optionally having hydroxy group) and acyloxy group (for example, acyloxy group having a carbon number of 2 to 5 optionally having carboxyl group). Representative examples of such the compounds are 1-chloro-3-hydroxy-1, 1, 3, 3-tetra n-butyldistannoxane, 1, 3-dichloro-1,1,3,3-tetra n-butyldistannoxane, 1, 3-diisothiocyanate-1,1,3,3-tetra n-butyldistannoxane, and 1-hydroxy-3-isothiocyanate-1,1,3,3-tetra n-butyldistannoxane.

The above distannoxanes have the advantages that they are cheap and easily synthesized and, in spite of an inorganic skeleton, they are soluble in almost all organic solvents. Further, while other metal catalysts generally simply reduce the activation energy of a forward reaction and an inverse reaction in a reaction of synthesizing a polyester by polycondensation of a diol and a dicarboxylic acid and, thus, have no effect on an equilibrium constant, the distannoxane catalysts do not cause a reverse reaction, that is, hydrolysis due to the presence of water in the reaction system. This is presumed to be due to the two-layer structure of distannoxanes. That is, it has been made clear that distannoxane takes a ladder-like dimer structure by the interaction similar to an ionic bond between an electron-excessive functional group (X, Y) such as oxygen atom and an electron-deficient tin atom as shown by, for example, the following formula:

[Chemical Formula 4]

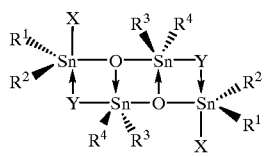

wherein $R^1$, $R^2$, $R^3$, $R^4$, X and Y are as defined above. It is considered that this dimer structure is formed also in a solution and re-access of produced water to a reaction point is prevented by the hydrophobic action of alkyl groups ($R^1$~$R^4$) which surround the circumference of this distannoxane skeleton. For this reason, when distannoxane is used as a catalyst for synthesizing a polyester by polycondensation of a diol and a dicarboxylic acid, a high polymerization degree polyester can be simply obtained under the mild conditions at a lower temperature and normal pressure without raising the temperature and performing dehydration procedure under reduced pressure. Therefore, distannoxane is useful for synthesizing an aliphatic polyester which easily undergoes hydrolysis. In the process of the present invention, by using the above distannoxane as a catalyst, inhibition of polycondensation due to water which is produced as a side product upon production of a polyester is reduced. In addition, by the presence of a distannoxane catalyst, hue of the produced polymer is improved.

An amount of the distannoxane catalyst to be added can be appropriately selected taking the cost and side reaction into consideration and, for example, the distannoxane catalyst is added to a dicarboxylic acid at an amount of, preferably, 0.0001 to 5 mole %, more preferably 0.0005 to 5 mole %, particularly preferably 0.001 to 1 mole %. When the amount of distannoxane catalyst to be added to is too great, a side reaction such as dehydration ring-closing reaction of a diol is easily caused, being economically disadvantageous. When the amount of the distannoxane catalyst to be added is too small, a molecular weight and yield of the produced polymer are easily lowered.

In the present invention, a dicarboxylic acid and a diol for forming a polyester are not particularly limited and a dicarboxylic acid and a diol which are used as a monomer component upon production of a normal polyester can be used. The process for production of the present invention is suitable particularly when the produced polyester is an aliphatic polyester. As used herein, an aliphatic polyester means a polyester obtained by polycondensation of a non-aromatic dicarboxylic acid and a non-aromatic diol.

Examples of the dicarboxylic acid are an aliphatic dicarboxylic acid such as oxalic acid, succinic acid, glutaric acid, adipic acid, azelaic acid and sebacic acid; an alicyclic dicarboxylic acid such as 1,4-cyclohexanedicarboxylic acid, 1,3-cyclohexanedicarboxylic acid, 1,2-cyclohexandicarboxylic acid, hexahydrophthalic acid, tetrahydrophthalic acid, 2, 3-norbornanedicarboxylic acid, 2, 5-norbornanedicarboxylic acid, 2,6-norbornanedicarboxylic acid, perhydro-1,4:5,8dimetanonaphthalene-2,3-dicarboxylic acid, tricyclodecanedicarboxylic acid, 1,3-adamantanedicarboxylic acid and 1,3-dimethyl-5,7-adamantanedicarboxylic acid; and aromatic dicarboxylic acid such as terephthalic acid, isophthalic acid, phthalic acid, 2,6-naphthalenedicarboxylic acid, 4,4'-biphenyldicarboxylic acid, 4, 4'-diphenyletherdicarboxylic acid, 4, 4'-diphenylmethanedicarboxylic acid, 4, 4'-diphenylsulfonedicarboxylic acid, 4, 4'-diphenylisopropylidenedicarboxylic acid, 1, 2-diphenoxyethane-4', 4"-dicarboxylic acid, anthracenedicarboxylic acid, 2,5-pyridinedicarboxylic acid, and diphenylketonedicarboxylic acid. These dicarboxylic acids can be used alone or in a combination thereof. Preferably, a non-aromatic dicarboxylic acid, that is, an aliphatic dicarboxylic acid and/or an alicyclic dicarboxylic acid is suitably used.

Examples of the diol are an aliphatic diol such as ethylene glycol, propylene glycol, trimethylene glycol, 1,4-butanediol, 1,5-pentanediol, 1,6-hexanediol and neopentyl glycol; an alicyclic diol such as 1,4-cyclohexanedimethanol, 1,3-cyclohexanedimethanol, 1,2-cyclohexanedimethanol, 1,1-cyclohexanediol, 2-methyl-1,1-cyclohexanediol, hydrogenated bisphenol A, tricyclodecanedimethanol, 1,3-adamantanediol, 2,2-norbornanedimethanol, 3-methyl-2,2-norbornanedimethanol, 2,3-norbornanedimethanol, 2,5-norbornanedimethanol, 2,6-norbornanedimethanol and perhydro-1,4:5,8dimetanonaphthalene-2,3-dimethanol; and an ether glycol such as diethylene glycol, triethylene glycol, polyethylene glycol and dipropylene glycol; an aromatic diol such as hydroquinone, catechol, resorcin, naphthalenediol, xylylenediol, bisphenol A, ethylene oxide adduct of bisphenol A, bisphenol S and ethylene oxide additive in bisphenol S. These diols can be used alone or in a combination of two or more of them. Preferably, a non-aromatic diol, that is, an aliphatic diol and/or an alicyclic diol is suitably used.

In the process of the present invention, a blending ratio of a dicarboxylic acid and a diol before polycondensation is such that a diol is preferably 1.00 to 1.20 mole, more preferably 1.00 to 1.10 mole, particularly preferably 1.00 mole relative to 1.00 mole of a dicarboxylic acid. When a blending ratio of a dicarboxylic acid and a diol is outside the above range, polymerization degree of the resulting polyester is easily reduced.

In the process of the present invention, as a method of a polycondensation reaction, the known method such as solution polycondensation, melt polycondensation and the like can be adopted.

As a preferable method of a polycondensation reaction, there is a method of melt polycondensing of a dicarboxylic acid and a diol under normal pressure in the presence of an organic solvent which does not dissolve any of a dicarboxylic acid, a diol and a polyester produced from a dicarboxylic acid and a diol and, as a result, in the presence of two phases of a phase composed mainly of a dicarboxylic acid, a diol and the produced polyester and a phase composed mainly of the above organic solvent.

In the process of the present invention, an organic solvent which does not dissolve any of a dicarboxylic acid, a diol and the produced polyester is not limited to specified ones as long as it does not inhibit a polycondensation reaction. A solvent which has a higher boiling point than that of water or azeotropes with water is preferable and a solvent having a boiling point higher than a melting point of the produced polyester is preferable. In addition, a solvent having a boiling point near the desired reaction temperature is preferable. More particularly, a solvent can be appropriately selected from n-octane, n-nonane, n-decane, n-undecane, n-dodecane, n-tridecane, n-tetradecane, n-pentadecane, decalin, benzene, trimethylbenzene, xylene, their isomers, quinoline, diphenyl ether, and a mixed solvent of two or more of them.

In the process of the present invention, an amount of an organic solvent which does not dissolve any of a dicarboxylic acid, a diol, and the produced polyester to be added is suitable such that an organic solvent is preferably 3 to 20 parts by weight, more preferably 2 to 15 parts by weight relative to total 1.0 part by weight of a dicarboxylic acid and a diol.

When the amount of an organic solvent to be added is smaller that 3 parts by weight, the effect of removal of water produced by polycondensation is easily reduced. When the amount is greater than 20 parts by weight, an amount of a dicarboxylic acid and that of a diol relative to an organic solvent becomes small, being not practical from a viewpoint of cost and the like.

A temperature for a polycondensation reaction in the process of the present invention can be appropriately selected taking a reaction rate and a side reaction (such as ring-closing reaction of a diol) into consideration. In addition, when melt polycondensation is performed, polymerization is performed at a temperature higher than a melting point of the produced polymer. Therefore, a preferable polymerization temperature is generally in a range of 80 to 280° C. although the temperature is different depending on the kind of diol and dicarboxylic acid used. For example, in a reaction of 1,4-butane diol and succinic acid, a range of 115 to 230° C. is preferable. When a polymerization temperature is too low, a reaction rate is lowered. Conversely, when a polymerization temperature is too high, a side reaction is occurs easily and a molecular weight of the produced polymer is easily reduced.

A reaction time for polycondensation can be appropriately selected from a range of 2 to 200 hours although it is different depending on the kind and the amount of dicarboxylic acid and diol as a raw material, a polycondensation temperature, the amount of catalyst and the like.

The reaction mechanism of a polycondensation reaction in the present invention can be considered as follows: for example, in the case where hydroxydistannoxane is used as a catalyst, a distannoxane catalyst and a dicarboxylic acid are first reacted to give distannoxane carboxylate, which is reacted with a diol to give alkoxydistannoxane, which works as a center of the catalysis cycle and, thereby, it is reacted with a monomer or a polymer, and polyesterification proceeds with water release.

When a dicarboxylic acid and a diol are melt polycondensed under normal pressure in the presence of a distannoxane catalyst and also in the presence of an organic solvent which does not dissolve any of a dicarboxylic acid, a diol and the polyester produced from a dicarboxylic acid and a diol and, as a result, in the presence of two phases of a phase composed mainly of a dicarboxylic acid, a diol and the produced polyester and a phase composed mainly of the organic solvent, a dicarboxylic acid and a diol are reacted and, when generation of a polyester begins, water produced by polycondensation moves into an organic solvent. On the other hand, since water present in a phase composed mainly of a dicarboxylic acid, a diol and the produced polyester does not re-access to a polyester which has been produced by a reaction in an active center of a distannoxane catalyst, a hydrolytic reaction of the produced polyester is not caused. Since water in an organic solvent is easily removed from the system by heat-reflux as described below, polycondensation further proceeds even under normal pressure without dehydration procedure under reduced pressure. In addition, since a dicarboxylic acid and a diol which are a reactant dissolve in an organic solvent with difficulty, a reactant is not diluted, and the concentration thereof is high, being advantageous for a polycondensation reaction. Therefore, a high polymerization degree polymer is easily obtained. In addition, since the produced polyester dissolves in the above organic solvent with difficulty, an organic solvent hardly remains after the completion of polymerization.

Since the process of the present invention does not require dehydration procedure under reduced pressure, a polycondensation reaction can be performed even under normal pressure. Therefore, the process is extremely advantageous for saving energy and, since installation can be greatly simplified, the process is advantageous from a viewpoint of cost.

A polyester produced by polycondensation can be isolated or purified by conventional methods such as filtration, concentration, precipitation, crystallization, cooling to solidify and the like. More particularly, a polyester can be obtained as a solid by placing the reaction solution into a poor solvent for a polymer to precipitate (or crystallize) or to re-precipitate (or recrystallize) if needed. Since a distannoxane catalyst is soluble in almost all organic solvents, a catalyst and a polymer can be easily separated by simple procedures such as precipitation and re-precipitation described above.

A solvent used in the above precipitation and re-precipitation can be appropriately selected depending on the kind of produced polymer (that is, the kind of diol and dicarboxylic acid). In general, an alcohol such as methanol, ethanol, propanol, 2-propanol and butanol; an aliphatic hydrocarbon such as heptane, hexane, octane and decane; an alicyclic hydrocarbon such as cyclohexane; an aromatic hydrocarbon such as benzene, toluene and xylene; a ketone such as acetone, methyl ethyl ketone and cyclohexanone; an ester such as methyl acetate, ethyl acetate and butyl acetate; an ether such as ethyl ether, butyl ether, ethylene glycol dimethyl ether and tetrahydrofuran; a nitrile such as acetonitrile; an amide such as N, N-demethylformamide; a carboxylic acid such as acetic acid; a halogenated hydrocarbon such as methylene chloride, chloroform, and a mixed solvent thereof are used.

Inter alia, an alcohol such as methanol and an aliphatic hydrocarbon such as hexane are preferable. In particular, when an alcohol such as methanol is used as a solvent for precipitation or re-precipitation, a low molecular weight polymer can be removed and a polymer having a high molecular weight and narrow molecular weight distribution can be obtained.

As a process of the present invention, there is a process by placing a dicarboxylic acid, a diol and a distannoxane catalyst as a raw material in a reactor, adding an organic solvent, refluxing an organic solvent and heating to melt a dicarboxylic acid, a diol and the polyester produced from a dicarboxylic acid and a diol. In this case, first, a dicarboxylic acid, a diol and a distannoxane catalyst are mixed and uniformized by heating to dissolve. An organic solvent is added thereto after uniformization of a dicarboxylic acid and a diol. When a dicarboxylic acid and a diol are polycondensed and generation of a polyester begins, water produced by polycondensation is removed from the system by distillation with an organic solvent and polycondensation further proceeds. When water distilled with an organic solvent is removed from the system, water may be distilled off using, for example, a Dean Stark apparatus. Water can be selectively removed with a Dean Stark apparatus from a mixture of water and an organic solvent.

The produced polyester can be removed from a container used in the reaction by removing an organic solvent. For example, after an organic solvent is distilled off, the polyester can be removed in a strand form from a container used in the reaction while it is in the melt state. Further, the removed polyester can be purified by conventional methods, such as precipitation, crystallization and the like.

Although the produced polyester has a small amount of an organic solvent mixed therein, it can be further treated by supplying to a biaxial extruder under vacuum aspiration in order to further remove a minor amount of an organic solvent mixed therein.

Then, the present invention is explained in detail by way of Examples but is not limited to them.

DESCRIPTION OF THE PREFERRED EMBODIMENTS

Embodiment 1(preparation of a catalyst)

6 ml was weighed from an ethanol solution (6.6 ml) of dichlorodibutyltin(IV)(3.34 g, 11 mmole) and added to an ethanol solution (13 ml) of potassium thiocyanate (1.94 g, 20 mmole). This solution was stirred at 100° C. for 20 hours, returned to room temperature and the produced potassium chloride was filtered. A solvent of a filtrate was removed and recrystallization from toluene afforded dibutyltin (IV) diisothiocyanate as white needle crystal (yield 57%).

mp:125~137° C.

IR:1970,2075cm$^{-1}$(NCS;NC stretching vibration)

Dibutyltin oxide (IV)(7.47 g, 30 mmole) and an ethanol solution (100 ml) of dibutyl (IV) diisothiocyanate (3.5 g,10 mmole) obtained by the above method were stirred at 100° C. for 6 hours. Then, ethanol was removed, the mixture was exposed to the external air for one day and, thereafter, recrystallization from n-hexane afforded 1-hydroxy-3-isothiocyanate-1,1,3,3-tetrabutyldistannoxane as white powder (yield 85%).

mp:105~120° C.

IR:625, 565cm$^{-1}$ (Sn—O—Sn)

2070cm$^{-1}$ (NCS;NC stretching vibration)

3425cm$^{-1}$ (OH)

EXAMPLE 1

Succinic acid (0.295 g, 2.5 mmole), 1,4-butanediol (0.225 g, 2.5 mmole) and 1-hydroxy-3-isothiocyanate-1,1,3,3-tetrabutyldistannoxane (0.014 g, 0.025 mmole) were placed in a round-bottom flask equipped with a condenser and stirred at 120° C. for 72 hours. After the reaction was complete, methanol was added to stir for 12 hours. After the resulting white powdery polymer was filtered, the polymer was dried at 60° C. under reduced pressure to obtain a polyester. Number average molecular weight Mn (polystyrene standard) of the resulting polyester was measured by GPC and found to be 4800. In addition, molecular weight distribution Mw/Mn was 1.70. Further, solubility of the resulting polyester in an organic solvent was examined and it was found that the polyester is easily dissolved in chloroform, m-cresol and sulfuric acid, and dissolved in acetone, ethyl acetate, toluene, 1, 4-dioxane, sulfuric acid, N-methylpyrrolidone, N,N-dimethylformamide, N, N-dimethylacetamide and dimethyl sulfoxide. In addition, the polyester was not dissolved in methanol and hexane.

mp (Tm):112° C.

IR (KBr):2945, 1335cm$^{-1}$ (—CH$_2$—)

I720cm$^{-1}$ (C=O)

1165cm$^{-1}$ (—O—)

1H-NMR (CDCl$_3$) δ: 1.71, 2.63, 4.12 (4H, m, CH$_2$)

13C-NMR (CDCl$_3$) δ: 25.2, 29.1, 64.3(CH$_2$), 172.6 (C=O )

EXAMPLE 2

According to the same manner as that of Example 1 except that 1,4-butanediol was used at an amount of 2.525 mmole (1.01-fold mole relative to succinic acid), a polyester was obtained (yield 83%). Number average molecular weight Mn of the resulting polyester was 7800, and molecular weight distribution-Mw/Mn was 1.98.

EXAMPLE 3

According to the same manner as that of Example 1 except that 1,4-butanediol was used at an amount of 2.575 mmole (1.03-fold mole relative to succinic acid), a polyester was obtained (yield 80%). Number average molecular weight Mn of the resulting polyester was 10000, and molecular weight distribution Mw/Mn was 2.41.

EXAMPLE 4

According to the same manner as that of Example 1 except that 1,4-butanediol was used at an amount of 2.625 mmole (1.05-fold mole relative to succinic acid), a polyester was obtained (yield 90%). Number average molecular weight Mn of the resulting polyester was 12100, and molecular weight distribution Mw/Mn was 2.63.

This polymer corresponds to 70-mer and it means that 99.8% of produced water was removed at an equilibrium constant of 4700 or an equilibrium constant of 10.

EXAMPLE 5

According to the same manner as that of Example 1 except that 1,4-butanediol was used at an amount of 2.75 mmole (1.10-fold mole relative to succinic acid), a polyester was obtained (yield 92%). Number average molecular weight Mn of the resulting polyester was 9900, and molecular weight distribution Mw/Mn was 2.35.

EXAMPLE 6

According to the same manner as that of Example 4 except that a polymerization temperature was 130° C., a polyester was obtained (yield 93%). Number average molecular weight Mn of the resulting polyester was 5000, and molecular weight distribution Mw/Mn was 2.16.

EXAMPLE 7

According to the same manner as that of Example 4 except that a polymerization temperature was 150° C., a polyester was obtained (yield 90%). Number average molecular weight Mn of the resulting polyester was 4700, and molecular weight distribution Mw/Mn was 2.18.

EXAMPLE 8

According to the same manner as that of Example 4 except that an amount of 1-hydroxy-3-isothiocyanate-1,1,3, 3-tetrabutyldistannoxane as a catalyst to be used was 0.0014 g (0.0025 mmole), a polyester was obtained (yield 86%). Number average molecular weight Mn of the resulting polyester was 3500, and molecular weight distribution Mw/Mn was 2.16.

EXAMPLE 9

According to the same manner as that of Example 1 except that a polymerization time was 168 hours, a polyester was obtained. Number average molecular weight Mn of the resulting polyester was 7400, and molecular weight distribution Mw/Mn was 1.91.

EXAMPLE 10

Succinic acid (2.36 g, 20 mmole), 1,4-butanediol (1.80 g, 20 mmole) and 1-chloro-3-hydoxy-1,1,3,3,-tetra n-butyldistannoxane (0.11 g, 2 mmole) as a catalyst were placed in a round-bottom flask equipped with a condenser and a stirrer, nitrogen is flown therein at 5 ml/min. under normal pressure and the system is heated at 120° C. for 1 hour into the uniform state. Further, decalin (4 ml, 3.6 g) was placed into the two-phased state, which was heated at 193° C. to perform a polycondensation reaction for 60 hours under refluxing with decalin while stirring. After the reaction was completed, decalin was removed by drainage and subsequently methanol was added thereto to stir for 12 hours. The resulting white powder polymer was filtered and dried at 60° C. to obtain a polyester.

Number average molecular weight Mn (polystyrene standard) of the resulting polyester was measured by GPC and found to be 10000. In addition, molecular weight distribution Mw/Mn was 1.71.

EXAMPLE 11

Succinic acid (2.36 g, 20 mmole), 1,4-butanediol (1.80 g, 20 mmole) and 1-chloro-3-hydoxy-1,1,3,3,-tetra n-butyldistannoxane (0.11 g, 2 mmole) as a catalyst were placed in a round-bottom flask equipped with a Dean Stark apparatus, a condenser and a stirrer, which was heated at 120° C. for 1 hour into the uniform state under normal pressure. Further, decalin (4 ml, 3.6 g) was placed into the two-phased state, which was heated at 193° C. and stirred for 48 hours to perform a polycondensation reaction under reflux with decalin while distilling water off. After the reaction was completed, decalin was removed by drainage and subsequently methanol was added thereto to stir for 12 hours. The resulting white powder polymer was filtered and dried at 60° C. to obtain a polyester.

Number average molecular weight Mn (polystyrene standard) of the resulting polyester was measured by GPC and found to be 45000. In addition, molecular weight distribution Mw/Mn was 1.74.

EXAMPLE 12

According to the same manner as that of Example 11 except that 1,3-dichloro-1,1,3,3,-tetra n-butyldistannoxane (1.060 g, 0.10 mmole) was used, a polyester was obtained. Number average molecular weight Mn of the resulting polyester was 43000, and molecular weight distribution Mw/Mn was 1.86.

EXAMPLE 13

According to the same manner as that of Example 11 except that n-octane (4 ml, 2.8 g) was used in stead of decalin, a polyester was obtained. A temperature for a polycondensation reaction was 120° C. Number average molecular weight Mn of the resulting polyester was 7000, and molecular weight distribution Mw/Mn was 2.10.

EXAMPLE 14

According to the same manner as that of Example 11 except that n-nonane (4 ml, 2.9 g) was used in stead of decalin, a polyester was obtained. A temperature for a polycondensation reaction was 150° C. Number average molecular weight Mn of the resulting polyester was 18000, and molecular weight distribution Mw/Mn was 1.80.

EXAMPLE 15

According to the same manner as that of Example 11 except that 1-chloro-3-hydroxy-1,1,3,3,-tetra n-butyldistannoxane (0.0011 g, 0.002 mmole) was used, a polyester was obtained. Number average molecular weight Mn of the resulting polyester was 147000, and molecular weight distribution Mw/Mn was 1.80.

EXAMPLE 16

1,4-cyclohexanedicarboxylic acid (3.44 g, 20 mmole), 1,4-cyclohexanedimethanol (2.88 g, 20 mmole) and 1-chloro-3-hydoxy-1,1,3,3,-tetra n-butyldistannoxane (0.11 g, 2 mmole) as a catalyst were placed in a round-buttom flask equipped with a Dean Stark apparatus, a condenser and a stirrer, which was heated at 120° C. for 1 hour into the uniform state under normal pressure. Further, decalin (4 ml, 3.6 g) was placed into the two-phased state, and the same procedures as those of Example 11 were performed to obtain a polyester. A temperature for a polycondensation reaction was 150° C. and a time for a polycondensation reaction was 72 hours. Number average molecular weight Mn of the resulting polyester was 15000. In addition, molecular weight distribution Mw/Mn was 2.10.

EXAMPLE 17

2,5-norbornanedicarboxylic acid (3.68 g, 20 mmole), 2,5-norbornanedimethanol (3.12 g, 20 mmole) and 1-chloro-3-hydoxy-1,1,3,3,-tetra n-butyldistannoxane (0.11 g, 2 mmole) as a catalyst were placed in a round-buttom flask equipped with a Dean Stark apparatus, a condenser and a stirrer, which was heated at 120° C. for 1 hour into the uniform state under normal pressure. Further, decalin (4 ml, 3.6 g) was placed into the two-phased state, and the same procedures as those of Example 11 were performed to obtain a polyester. A temperature for a polycondensation reaction was 120° C. and a time for a polycondensation reaction was 72 hours. Number average molecular weight Mn of the resulting polyester was 6000. In addition, molecular weight distribution Mw/Mn was 1.92.

EXAMPLE 18

2,5-norbornanedicarboxylic acid (3.68 g, 20 mmole), 2,5-norbornanedimethanol (3.12 g, 20 mmole) and 1-chloro-3-hydoxy-1,1,3,3,-tetra n-butyldistannoxane (0.022 g, 0.04 mmole) as a catalyst were placed in a round-buttom flask equipped with a Dean Stark apparatus, a condenser and a stirrer, which was heated at 120° C. for 1 hour into the uniform state under normal pressure. Further, decalin (4 ml, 3.6 g) was placed into the two-phased state, and the same procedures as those of Example 11 were performed to obtain a polyester. A temperature for a polycondensation reaction was 120° C. and a time for a polycondensation reaction was 72 hours. Number average molecular weight Mn of the resulting polyester was 4000. In addition, molecular weight distribution Mw/Mn was 1.80.

EXAMPLE 19

Terephthalic acid (3.32 g, 20 mmole), 2,5-norbornanedimethanol (3.12 g, 20 mmole) and 1-chloro-3-hydoxy-1,1,3,3,-tetra n-butyldistannoxane (0.11 g, 0.2 mmole) as a catalyst were placed in a round-buttom flask equipped with a Dean Stark apparatus, a condenser and a stirrer, which was heated at 120° C. for 1 hour into the uniform state under normal pressure. Further, decalin (4 ml, 3.6 g) was placed into the two-phased state, and the same procedures as those of Example 11 were performed to obtain a polyester. A temperature for a polycondensation reaction was 120° C. and a time for a polycondensation reaction was 72 hours. Number average molecular weight Mn of the resulting polyester was 10000. In addition, molecular weight distribution Mw/Mn was 1.96.

EXAMPLE 20

1,3-adamantanedicarboxylic acid (4.49 g, 20 mmole), 1,3-adamantanedimethanol (3.36 g, 20 mmole) and 1-chloro-3-hydoxy-1,1,3,3,-tetra n-butyldistannoxane (0.11 g, 0.2 mmole) as a catalyst were placed in a round-buttom flask equipped with a Dean Stark apparatus, a condenser and a stirrer, which was heated at 190° C. for 1 hour into the uniform state under normal pressure. Further, decalin (4 ml, 3.6 g) was placed into the two-phased state, and the same procedures as those of Example 11 were performed to obtain a polyester. A temperature for a polycondensation reaction was 120° C. and a time for a polycondensation reaction was 72 hours. Number average molecular weight Mn of the resulting polyester was 8000. In addition, molecular weight distribution Mw/Mn was 2.12.

EXAMPLE 21

Tricyclodecanedicarboxylic acid (4.49 g, 20 mmole), tricyclodecanedimethanol (3.92 g, 20 mmole) and 1-chloro-3-hydoxy-1,1,3,3,-tetra n-butyldistannoxane (0.11 g, 0.2 mmole) as a catalyst were placed in a round-buttom flask equipped with a Dean Stark apparatus, a condenser and a stirrer, which was heated at 120° C. for 1 hour into the uniform state under normal pressure. Further, decalin (4 ml, 3.6 g) was placed into the two-phased state, and the same procedures as those of Example 11 were performed to obtain a polyester. A temperature for a polycondensation reaction was 120° C. and a time for a polycondensation reaction was 72 hours. Number average molecular weight Mn of the resulting polyester was 13000. In addition, molecular weight distribution Mw/Mn was 2.30.

EXAMPLE 22

5,7-dimethyl-1,3-adamantanedicarboxylic acid (5.05 g, 20 mmole), 5,7-dimethyl-adamantanediol (3.93 g, 20 mmole) and 1-chloro-3-hydoxy-1,1,3,3,-tetra n-butyldistannoxane (0.11 g, 0.2 mmole) as a catalyst were placed in a round-buttom flask equipped with a Dean Stark apparatus, a condenser and a stirrer, which was heated at 190° C. for 1 hour under normal pressure. Further, decalin (4 ml, 3.6 g) was placed into the two-phased state, and the same procedures as those of Example 11 were performed to obtain a polyester. A temperature for a polycondensation reaction was 120° C. and a time for a polycondensation reaction was 72 hours. Number average molecular weight Mn of the resulting polyester was 9000. In addition, molecular weight distribution Mw/Mn was 2.04.

EXAMPLE 23

Succinic acid (2.36 kg, 20 mmole), 1,4-butanediol (1.80 kg, 20 mmole) and 1-chloro-3-hydoxy-1,1,3,3,-tetra n-butyldistannoxane (0.11 g, 0.2 mmole) as a catalyst were placed in a round-buttom flask equipped with a Dean Stark apparatus, a condenser and a stirrer, which was heated at 120° C. for 1 hour into the uniform state under normal pressure. Further, decalin (4ml, 3.6 g) was placed into the two-phased state, which was heated at 193° C. and stirred for 48 hours under reflux with decalin while distilling water off to perform a polycondensation reaction. After the reaction was completed, decalin was removed by drainage, the resulting polymer was supplied to a biaxial extruder and extruded at 150° C. under vacuum to pelletize with a pelletizer, to obtain a polyester. Number average molecular weight Mn of the resulting polyester was 90000. In addition, molecular weight distribution Mw/Mn was 2.28.

Comparative Example 1

In Example 10, stirring was performed at 193° C. for 60 hours without the use of decalin. After the reaction was completed, methanol was added to stir for 12 hours. The resulting powdery polymer was filtered and dried at 60° C. under reduced pressure to obtain a polyester. Number average molecular weight of the resulting polyester Mn was 4000 and molecular weight distribution Mw/Mn was 1.81.

According to the process of the invention, high polymerization degree aliphatic polyester can be easily obtained without the use of a high boiling point solvent and dehydration procedure under reduced pressure. Further, an aliphatic polyester can be industrially produced effectively.

What is claimed is:

1. A process for producing a polyester from a dicarboxylic acid and a diol, which comprises polycondensing the dicarboxylic acid and the diol in the presence of a distannoxane catalyst.

2. The process for producing a polyester according to claim 1, wherein the polyester is produced by melt polycondensation.

3. The process for producing a polyester according to claim 1, wherein the carboxylic acid and the diol are melt polycondensed under normal pressure in the presence of the distannoxane catalyst and also in the presence of an organic solvent which does not dissolve any of the dicarboxylic acid, the diol and the polyester produced from the carboxylic acid and the diol and, as a result, in the presence of mainly two phases.

4. The process for producing a polyester according to claim 1, wherein the distannoxane catalyst is a distannoxane catalyst represented by the following formula (1):

[Chemical Formula 1]

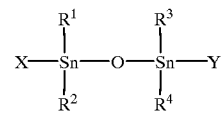

(1)

wherein $R^1, R^2, R^3$ and $R^4$ are the same or different and denote alkyl group, and X and Y are the same or different and denote isothiocyanate group, halogen atom, hydroxy group, alkoxy group, or acyloxy group.

5. The process for producing a polyester according to claim 4, wherein the polyester is produced by melt polycondensation.

6. The process for producing a polyester according to claim 3, wherein the distannoxane catalyst is a distannoxane catalyst represented by the following formula (1):

[Chemical Formula 2]

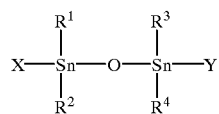
(1)

wherein $R^1, R^2, R^3$ and $R^4$ are the same or different and denote alkyl group, and X and Y are the same or different and denote isothiocyanate group, halogen atom, hydroxy group, alkoxy group, or acyloxy group.

7. The process for producing a polyester according to claim 4, wherein $R^1$, $R^2$, $R^3$ and $R^4$ are butyl group, X is isothiocyanate group, and Y is hydroxy group, alkoxy group, or acyloxy group in the formula (1).

8. The process for producing a polyester according to claim 1, wherein the dicarboxylic acid is mainly a non-aromatic dicarboxylic acid and the diol is mainly a non-aromatic diol.

9. The process for producing a polyester according to claim 3, wherein the dicarboxylic acid is mainly a non-aromatic dicarboxylic acid and the diol is mainly a non-aromatic diol.

10. The process for producing a polyester according to claim 4, wherein the dicarboxylic acid is mainly a non-aromatic dicarboxylic acid and the diol is mainly a non-aromatic diol.

11. The process for producing a polyester according to claim 6, wherein the dicarboxylic acid is mainly a non-aromatic dicarboxylic acid and the diol is mainly a non-aromatic diol.

12. The process for producing a polyester according to claim 1, wherein the diol is used at an amount of 1.00 to 1.20 mole relative to 1 mole of the dicarboxylic acid.

13. The process for producing a polyester according to claim 3, wherein the diol is used at an amount of 1.00 to 1.20 mole relative to 1 mole of the dicarboxylic acid.

14. The process for producing a polyester according to claim 4, wherein the diol is used at an amount of 1.00 to 1.20 mole relative to 1 mole of the dicarboxylic acid.

15. The process for producing a polyester according to claim 6, wherein the diol is used at an amount of 1.00 to 1.20 mole relative to 1 mole of the dicarboxylic acid.

16. The process for producing a polyester according to claim 1, wherein the polymer produced by polymerization is isolated by precipitation or re-precipitation with an alcohol.

17. The process for producing a polyester according to claim 4, wherein the polymer produced by polymerization is isolated by precipitation or re-precipitation with an alcohol.

* * * * *